US008488302B2

(12) United States Patent
Mills et al.

(10) Patent No.: US 8,488,302 B2
(45) Date of Patent: Jul. 16, 2013

(54) CIRCUIT BREAKER PANEL

(75) Inventors: Patrick W. Mills, Bradenton, FL (US);
Kevin F. Hanley, Bradenton, FL (US);
James M. McCormick, Bradenton, FL
(US); Richard G. Benshoff, Sarasota,
FL (US)

(73) Assignee: Eaton Corporation, Cleveland, OH (US)

( * ) Notice: Subject to any disclaimer, the term of this patent is extended or adjusted under 35 U.S.C. 154(b) by 200 days.

(21) Appl. No.: 13/086,442

(22) Filed: Apr. 14, 2011

(65) Prior Publication Data

US 2012/0262848 A1 Oct. 18, 2012

(51) Int. Cl.
*H02B 1/04* (2006.01)
*H02B 1/26* (2006.01)

(52) U.S. Cl.
USPC ............ 361/636; 361/622; 361/631; 361/641

(58) Field of Classification Search
None
See application file for complete search history.

(56) References Cited

U.S. PATENT DOCUMENTS

| 3,767,977 | A |   | 10/1973 | Bachman |
| 4,679,120 | A | * | 7/1987  | Raabe et al. ................. 361/647 |
| 4,918,566 | A |   | 4/1990  | Brodsky et al. |
| 5,126,918 | A | * | 6/1992  | Morby et al. ................. 361/644 |
| 5,233,511 | A |   | 8/1993  | Bilas et al. |
| 5,394,296 | A |   | 2/1995  | Erickson, Jr. et al. |
| 5,466,974 | A |   | 11/1995 | Sutrina et al. |
| 5,612,579 | A |   | 3/1997  | Wisbey et al. |
| 5,726,852 | A | * | 3/1998  | Trifiletti et al. ............... 361/115 |
| 5,752,047 | A |   | 5/1998  | Darty et al. |
| 5,784,249 | A | * | 7/1998  | Pouliot .......................... 361/622 |
| 5,808,847 | A |   | 9/1998  | Ferrazzi |
| 5,894,404 | A | * | 4/1999  | Vrnak et al. .................. 361/627 |
| 5,901,033 | A |   | 5/1999  | Crawford et al. |
| 6,039,581 | A |   | 3/2000  | DiMarco |
| 6,146,788 | A |   | 11/2000 | Ikeda et al. |
| 6,431,894 | B1|   | 8/2002  | Boiret et al. |
| 6,501,649 | B2| * | 12/2002 | Yanes et al. ................... 361/692 |

(Continued)

FOREIGN PATENT DOCUMENTS

| EP | 0 900 700 A2 | 3/1999 |
| GB | 2 347 280 A  | 8/2000 |
| WO | 2007/082071 A2 | 7/2007 |

OTHER PUBLICATIONS

European Patent Office, "International search report and Written Opinion", Jul. 26, 2012, 11 pp.

*Primary Examiner* — Boris Chervinsky
(74) *Attorney, Agent, or Firm* — Eckert Seamans Cherin & Mellott, LLC; Kirk D. Houser

(57) ABSTRACT

A circuit breaker panel includes a number of circuit breaker modules each having a number of connectors, a plurality of circuit breakers and a circuit structure supporting the circuit breakers and electrically interconnecting the circuit breakers with the number of connectors. The panel also includes a monitoring module having a connector and a monitoring circuit to monitor at least one line voltage and, for each of the circuit breakers, at least one load voltage. The panel further includes a frame having a first connector for the monitoring module connector, a number of second connectors for the circuit breaker module connectors, and a number of third connectors for outputs from the circuit breaker modules. Conductors are connected to the connectors. Any of the monitoring module and the number of circuit breaker modules can be installed into or removed from the frame without change to the conductors.

23 Claims, 14 Drawing Sheets

U.S. PATENT DOCUMENTS

| | | |
|---|---|---|
| 6,538,870 B2 | 3/2003 | Seese et al. |
| 6,974,333 B2 | 12/2005 | Wildes et al. |
| 7,052,313 B2 | 5/2006 | Gorman |
| 7,270,575 B2 | 9/2007 | Krantz, Jr. et al. |
| 7,276,436 B2 | 10/2007 | Kawai et al. |
| 7,280,337 B2 | 10/2007 | Engel |
| 7,338,331 B2 | 3/2008 | Yoon |
| 7,393,248 B2 | 7/2008 | Best et al. |
| 7,460,360 B2 * | 12/2008 | Schomaker et al. .......... 361/631 |
| 7,633,022 B2 | 12/2009 | Zöls |
| 7,646,572 B2 | 1/2010 | Mills et al. |
| 7,837,496 B1 | 11/2010 | Pal |
| 7,898,787 B2 * | 3/2011 | Johnsen et al. ................ 361/119 |
| 8,320,107 B2 * | 11/2012 | Coffey et al. ................. 361/624 |
| 2002/0070610 A1 | 6/2002 | Bersiek |
| 2004/0000815 A1 | 1/2004 | Pereira |
| 2005/0170678 A1 | 8/2005 | Donahue, IV |
| 2006/0139855 A1 | 6/2006 | Ewing et al. |
| 2007/0103828 A1 | 5/2007 | Larson et al. |
| 2007/0108963 A1 | 5/2007 | Wavering et al. |
| 2008/0160796 A1 | 7/2008 | Diessner et al. |
| 2009/0130918 A1 | 5/2009 | Nguyen et al. |
| 2009/0184574 A1 | 7/2009 | Zavidniak et al. |
| 2009/0269948 A1 | 10/2009 | Nemoz et al. |
| 2009/0273234 A1 | 11/2009 | Wavering et al. |
| 2009/0325407 A1 | 12/2009 | Nguyen et al. |
| 2010/0296229 A1 | 11/2010 | Meux et al. |
| 2011/0034058 A1 | 2/2011 | Riedel et al. |

* cited by examiner

CIRCUIT BREAKER PANEL

BACKGROUND

1. Field

The disclosed concept pertains generally to circuit breakers and, more particularly, to circuit breaker assemblies, such as, for example, circuit breaker panels for a plurality of circuit breakers.

2. Background Information

Circuit breakers are used, for example, in aircraft electrical systems where they not only provide overcurrent protection but also serve as switches for turning equipment on and off. Aircraft or subminiature circuit breakers, for instance, are typically relatively small to accommodate the relatively high-density layout of aircraft circuit breaker panels, which make circuit breakers for numerous circuits accessible to a user. Aircraft electrical systems can consist, for example, of hundreds of circuit breakers, each of which is used for a circuit protection function as well as a circuit disconnection function through a push-pull handle.

The circuit breaker push-pull handle is moved from in-to-out in order to open the corresponding load circuit. This action may be either manual or, else, automatic in the event of an overload or fault condition. If the push-pull handle is moved from out-to-in, then the load circuit is re-energized. If the load circuit had been automatically de-energized, then the out-to-in operation of the push-pull handle corresponds to a circuit breaker reset action.

Such circuit breakers typically include a threaded bezel. A suitable fastener, such as a nut and washer, mount the circuit breaker at a corresponding opening of an aircraft circuit breaker mounting panel. The push-pull handle passes through the bezel to the user side of the mounting panel. The circuit breaker also typically includes line and load screw terminals disposed on the opposite maintenance side of the mounting panel.

U.S. Pat. No. 5,612,579 discloses a power distribution center including at least one printed circuit board of at least one layer within a housing routing electrical power from a plurality of power feeders to a first contact on a plurality of screw-in sockets disposed within a surface of the housing. The printed circuit board routes electrical power from a second contact on the plurality of screw-in sockets to a plurality of connector ports disposed on an opposite surface of the housing. This facilitates electrical connection to external loads requiring electrical power. A plurality of manually resettable screw-in type circuit breakers are screwably seated within the screw-in sockets for switchably connecting the first contact of the screw-in sockets to the second contact. Power from the power feeders is routed to the first contact via smaller power feeders on one side of the printed circuit board.

It is known to mount conventional aircraft or aerospace circuit breakers on a panel. Such circuit breakers employ line and load terminals disposed behind the panel. Maintenance personnel must remove line and load conductors from the respective line and load terminals, in order to replace a single circuit breaker among plural such circuit breakers mounted on the panel. Therefore, a circuit breaker panel that simplifies maintenance is needed.

It is also known to employ conventional circuit breakers each including auxiliary contacts, in order to monitor the open or closed status of the corresponding circuit breaker. However, such circuit breakers employ discrete wiring between the auxiliary contacts and a remote monitoring device or annunciator. Hence, additional maintenance is needed to replace a single circuit breaker including auxiliary contacts. Accordingly, a circuit breaker panel that monitors the open or closed status of plural circuit breakers without complicating maintenance is needed.

There is room for improvement in circuit breaker panels.

SUMMARY

These needs and others are met by embodiments of the disclosed concept, which provides a circuit breaker panel that simplifies maintenance operations.

In accordance with one aspect of the disclosed concept, a circuit breaker panel comprises: a number of circuit breaker modules, each of the number of circuit breaker modules comprising a number of connectors, a plurality of circuit breakers each including at least one line terminal and at least one load terminal, and a circuit structure supporting the circuit breakers and electrically interconnecting the at least one line terminal and the at least one load terminal of each of the circuit breakers with the number of connectors, the at least one line terminal being structured to receive at least one line voltage, the at least one load terminal being structured to output at least one load voltage; a monitoring module comprising a connector structured to receive the at least one line voltage and, for each of the circuit breakers of the number of circuit breaker modules, the at least one load voltage, and a monitoring circuit structured to monitor the at least one line voltage and, for each of the circuit breakers of the number of circuit breaker modules, the at least one load voltage; a frame comprising: a first connector coupled to the frame and structured to removably electrically and mechanically engage the connector of the monitoring module, a number of second connectors coupled to the frame, each of the number of second connectors being structured to removably electrically and mechanically engage the connector of a corresponding one of the number of circuit breaker modules, and a number of third connectors coupled to the frame, each of the number of third connectors being structured to output, for each of the circuit breakers of a number of the number of circuit breaker modules, the at least one load voltage from the connector of a corresponding one of the number of circuit breaker modules; a plurality of first conductors, each of the plurality of first conductors being electrically connected between one of the number of third connectors and one of the number of second connectors corresponding to the connector of one of the number of circuit breaker modules; a plurality of second conductors, each of the plurality of second conductors being electrically connected between the first connector and one of the number of second connectors corresponding to the connector of one of the number of circuit breaker modules, wherein each of the number of third connectors is further structured to receive a plurality of third conductors, each of the plurality of third conductors being structured to be electrically connected to a corresponding load, and whereby any of the monitoring module and the number of circuit breaker modules can be installed into or removed from the frame without change to any of the plurality of first conductors, the plurality of second conductors and the plurality of third conductors.

As another aspect of the disclosed concept, a circuit breaker panel comprises: a number of circuit breaker modules, each of the number of circuit breaker modules comprising a number of fasteners, a number of connectors, a plurality of circuit breakers each including at least one line terminal and at least one load terminal, and a circuit structure supporting the circuit breakers and electrically interconnecting the at least one line terminal and the at least one load terminal of each of the circuit breakers with the number of connectors, the at least one line terminal being structured to receive at least one line voltage, the at least one load terminal being structured to output at least one load voltage; a monitoring module comprising a number of fasteners, a connector structured to receive the at least one line voltage and, for each of the circuit breakers of the number of circuit breaker modules, the at least one load voltage, and a monitoring circuit structured to monitor the at least one line voltage and, for each of the circuit breakers of the number of circuit breaker modules, the at least one load voltage; a frame comprising: a number of first apertures cooperating with the number of fasteners of the monitoring module to removably fasten the monitoring module to the frame, a number of sets of a number of second apertures, each of the number of sets cooperating with the number of fasteners of a corresponding one of the number of circuit breaker modules to removably fasten the corresponding one of the number of circuit breaker modules to the frame, a first connector coupled to the frame and structured to removably electrically and mechanically engage the connector of the monitoring module, a number of second connectors coupled to the frame, each of the number of second connectors being structured to removably electrically and mechanically engage the connector of a corresponding one of the number of circuit breaker modules, and a number of third connectors coupled to the frame, each of the number of third connectors being structured to output, for each of the circuit breakers of a number of the number of circuit breaker modules, the at least one load voltage from the connector of a corresponding one of the number of circuit breaker modules; a plurality of first conductors, each of the plurality of first conductors being electrically connected between one of the number of third connectors and one of the number of second connectors corresponding to the connector of one of the number of circuit breaker modules; a plurality of second conductors, each of the plurality of second conductors being electrically connected between the first connector and one of the number of second connectors corresponding to the connector of one of the number of circuit breaker modules, wherein each of the number of third connectors is further structured to receive a plurality of third conductors, each of the plurality of third conductors being structured to be electrically connected to a corresponding load, and whereby any of the monitoring module and the number of circuit breaker modules can be installed into or removed from the frame without change to any of the plurality of first conductors, the plurality of second conductors and the plurality of third conductors.

The status signals may include, for each of the circuit breakers, an indication that a corresponding one of the second conductors is energized, which corresponds to a corresponding one of the circuit breakers being closed, and an indication that another corresponding one of the second conductors is energized, which corresponds to a corresponding feeder being energized.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
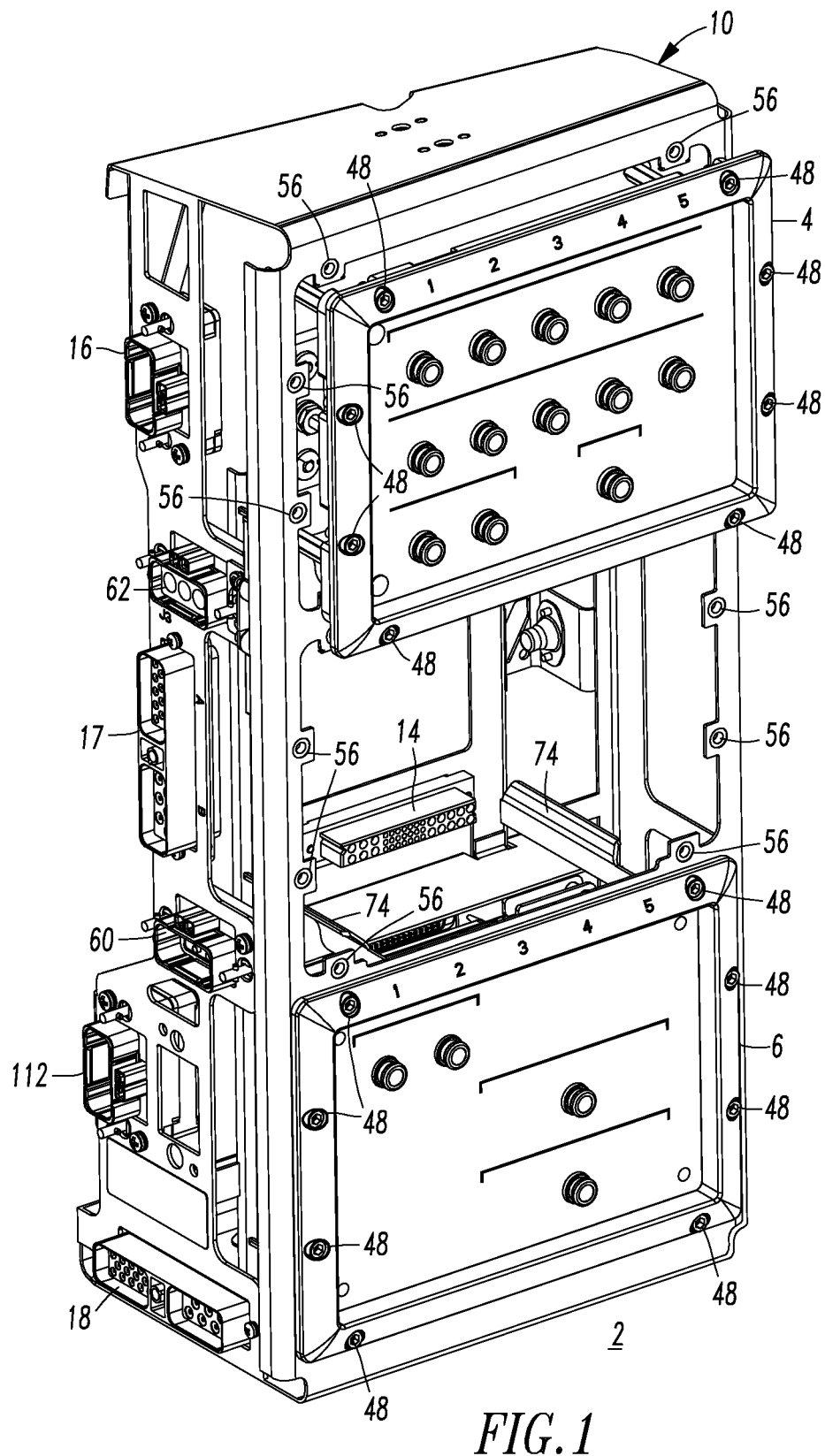
FIG. 1 is a front vertical isometric view of a circuit breaker panel with one circuit breaker module removed to show internal structures in accordance with embodiments of the disclosed concept.

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a controller; a central processing unit; a mainframe computer; a mini-computer; a server; a networked processor; or any suitable processing device or apparatus.

As employed herein, the terms "electrical conductor" or "conductor" shall mean a wire (e.g., solid; stranded; insulated; non-insulated), a copper conductor, an aluminum conductor, a suitable metal conductor, or other suitable material or object that permits an electric current to flow easily.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with a circuit breaker panel for aircraft circuit breakers, although the disclosed concept is applicable to a wide range of circuit breaker panels.

Referring to FIGS. 1-5, a circuit breaker panel 2 includes a number of circuit breaker modules 4,5,6 (e.g., without limitation, a number of two example DC circuit breaker modules 4,5, and one example AC circuit breaker module 6) each having a connector 7 (shown in FIG. 6), a monitoring module 8 having a connector 9 (shown in hidden line drawing in FIG. 5), and a frame 10 including a first connector 12 (FIGS. 4 and 5) coupled to the frame 10 for the monitoring module 8 and structured to removably electrically and mechanically engage the monitoring module connector 9. The circuit breaker panel 2 further includes a number of second connectors 14 coupled to the frame 10 for the number of circuit breaker modules

4,5,6. Each of the number of second connectors 14 is structured to removably electrically and mechanically engage the connector 7 of a corresponding one of the number of circuit breaker modules 4,5,6. A number of third connectors 16,17, 18 are coupled to the frame 10.

The circuit breaker panel 2 also includes a plurality of first conductors 20,21,22, each of which is electrically connected between one of the number of third connectors 16,17,18, respectively, and one of the number of second connectors 14 corresponding to the connector 7 of one of the number of circuit breaker modules 4,5,6. The circuit breaker panel 2 further includes a plurality of second conductors 24,25,26 (e.g., without limitation, 22 AWG conductors) each of which is electrically connected between the first connector 12 and one of the number of second connectors 14 corresponding to the connector 7 of one of the number of circuit breaker modules 4,5,6. Each of the number of third connectors 16,17,18 (e.g., without limitation, a number of two DC load connectors 16,17, and one AC load connector 18) is further structured to receive a plurality of third conductors 28,29,30 (e.g., without limitation, 16 AWG conductors) (shown in phantom line drawing) each of which is structured to be electrically connected to a corresponding load (not shown). Any of the monitoring module 8 and the number of circuit breaker modules 4,5,6 can be installed into or removed from the frame 10 without change to any of the plurality of first conductors 20,21,22, the plurality of second conductors 24,25,26, and the plurality of third conductors 28,29,30.

Each of the number of second connectors 14 includes a first plurality of conductor members 15A for a plurality of the plurality of first conductors 20,21,22 (e.g., within the frame 10 for an AC load or DC load). Each of the plurality of the plurality of first conductors 20,21,22 is electrically connected between one of the number of third connectors 16,17,18 (e.g., for connection to an AC load or DC load) and one of the first plurality of conductor members 15A. Each of the number of second connectors 14 further includes a second plurality of conductor members 15B for a plurality of the plurality of second conductors 24,25,26 (e.g., a current limited AC load voltage or DC load voltage, or a line voltage). Each of the plurality of the plurality of second conductors 24,25,26 is electrically connected between the first connector 12 and one of the second plurality of conductor members 15B.

Figure 8:
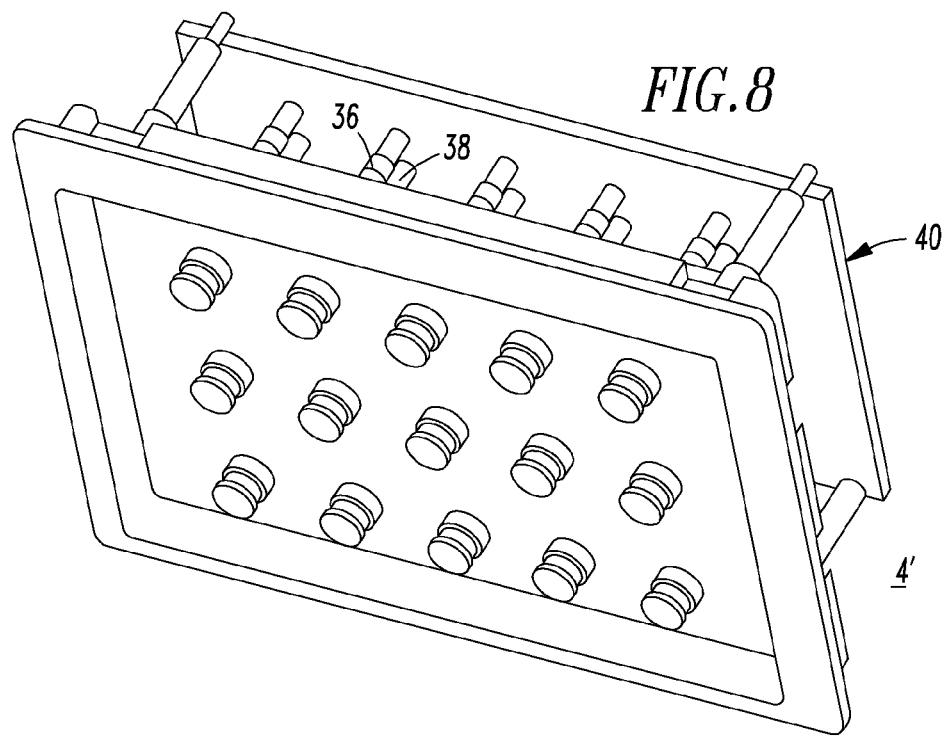
FIG. 8 is a front isometric view of a circuit breaker panel module for the circuit breaker panel of FIG. 1.
Figure 9:
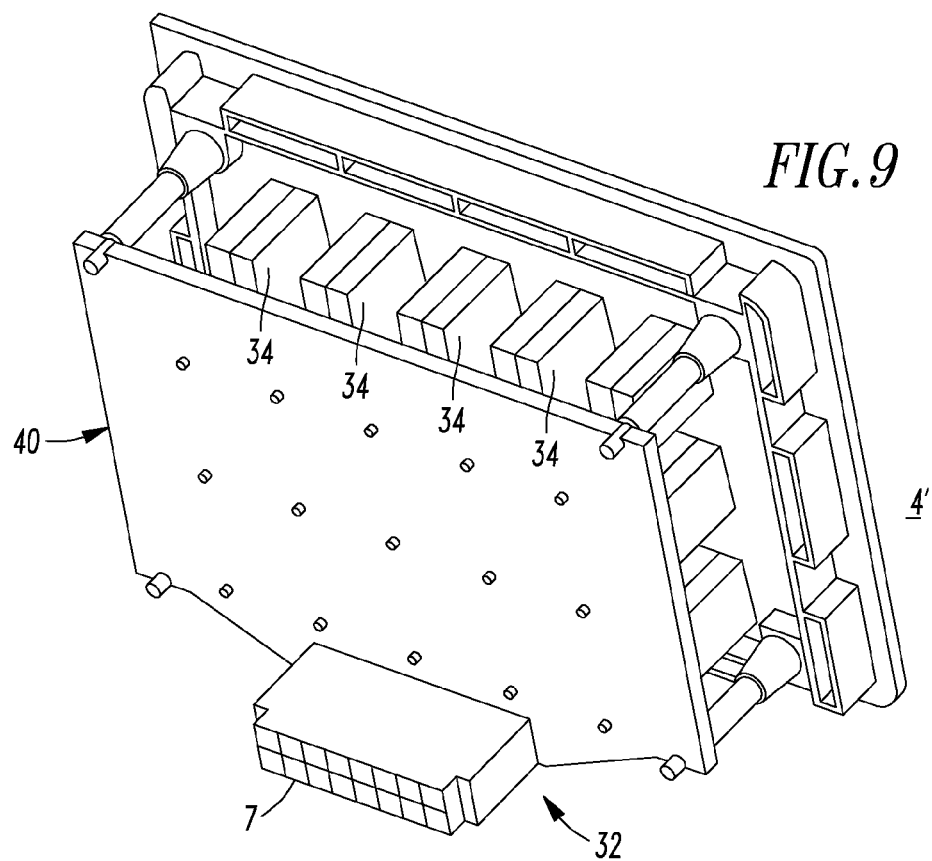
FIG. 9 is a rear isometric view of the circuit breaker panel module of FIG. 8.
Figure 10:
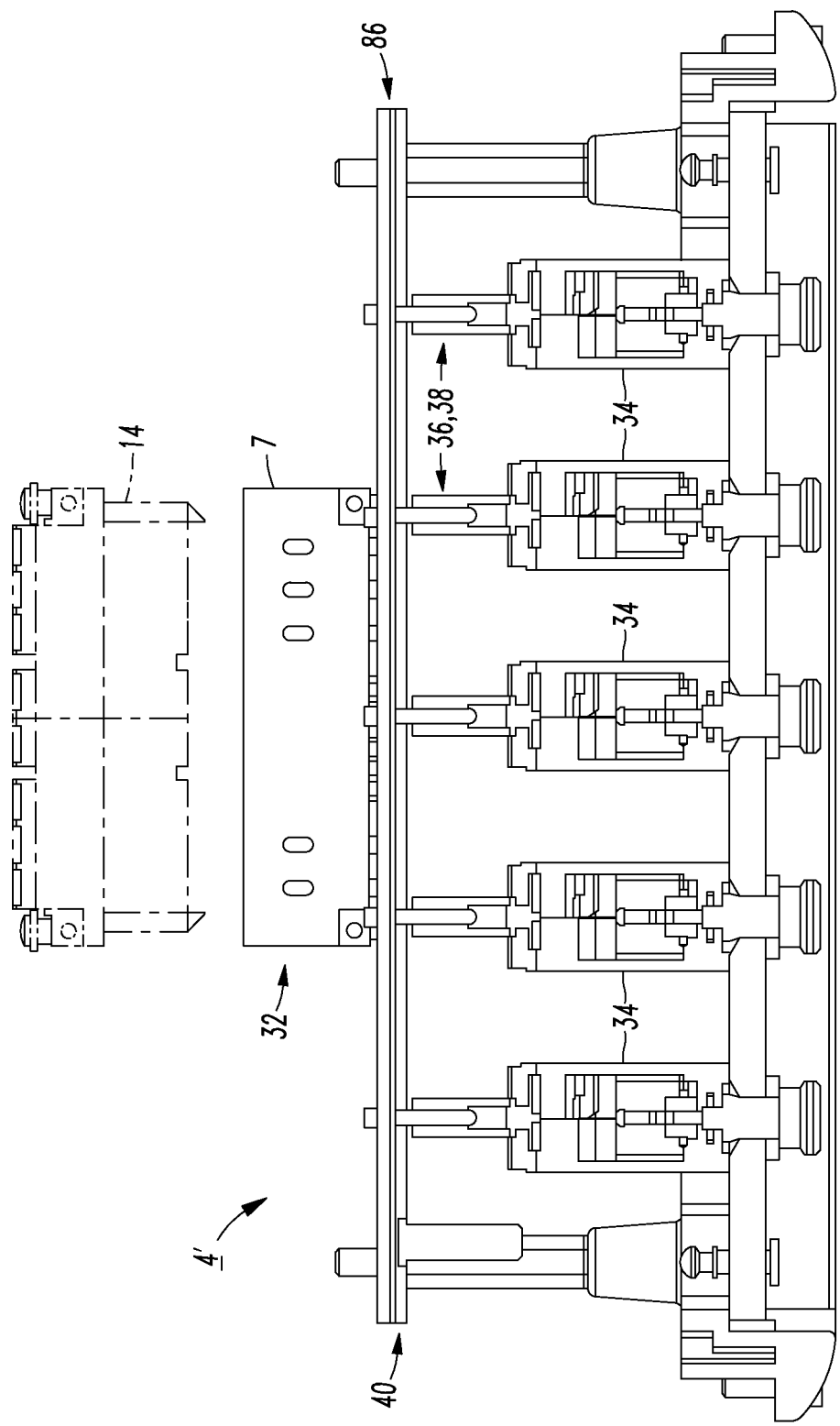
FIG. 10 is a top plan view of the circuit breaker panel module of FIG. 8.

As shown with circuit breaker module 4' of FIGS. 8-10, each of the number of circuit breaker modules 4,5,6 includes a number of connectors 7 or 32, a plurality of circuit breakers 34 each including at least one line terminal 36 and at least one load terminal 38, and a circuit structure 40 supporting the circuit breakers 34 and electrically interconnecting the at least one line terminal 36 and the at least one load terminal 38 of each of the circuit breakers 34 with the number of connectors 7 or 32.

Figure 16:
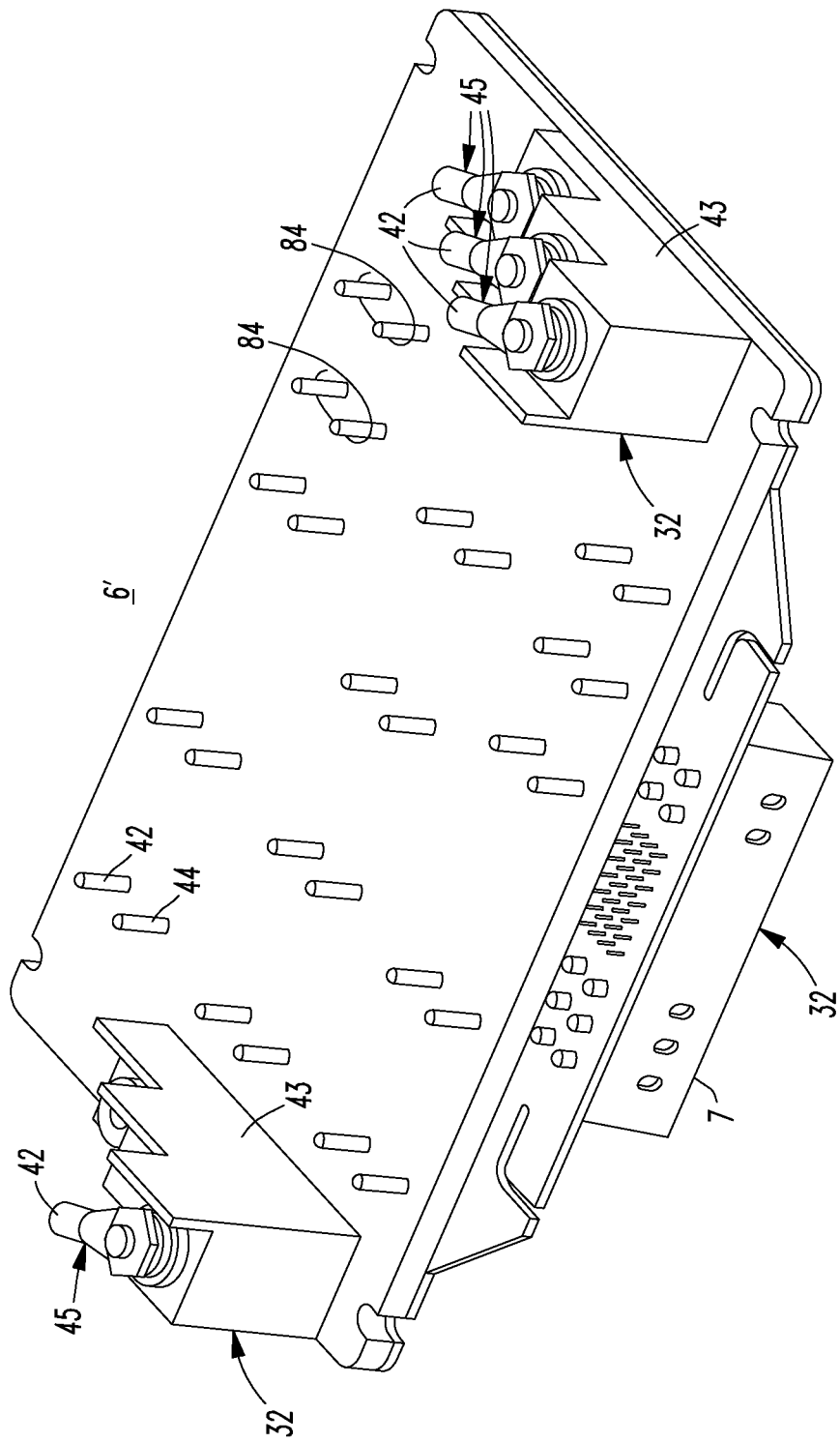
FIG. 16 is an isometric view of an AC circuit breaker panel module including two line connectors.
Figure 17:
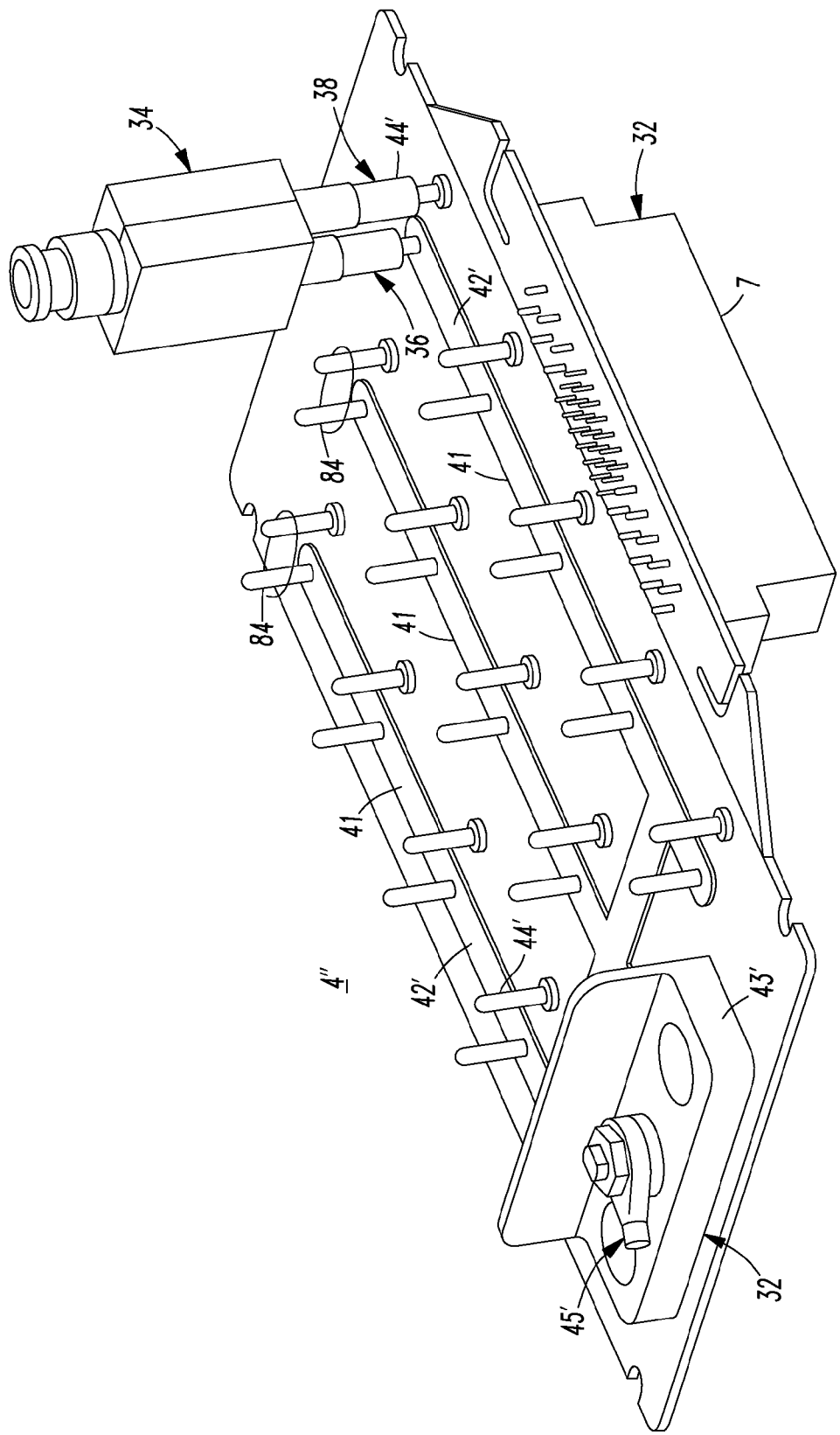
FIG. 17 is an isometric view of a DC circuit breaker panel module including a line connector.

As shown with the circuit breaker modules 6' and 4" of FIGS. 16 and 17, respectively, the at least one line terminal 36 is structured to receive at least one line voltage 42,42'. The at least one load terminal 38 is structured to output at least one load voltage 44, 44'.

Each of the number of circuit breaker modules 4,5,6, as shown with modules 6' and 4", further includes a number of line (e.g., feeder) connectors 43,43' receiving the at least one line voltage 42,42'. The number of line connectors 43 is a plurality of AC line (e.g., feeder) connectors 43 receiving a plurality of AC line voltages 42. The number of line connectors 43' is a DC line (e.g., feeder) connector 43' receiving a DC line voltage 42'. It will be appreciated that the circuit breaker modules 4',4" and 6' are essentially the same as the corresponding circuit breaker modules 4 and 6, respectively, except for the configuration and count of circuit breakers 34 disposed therein.

The monitoring module connector 9 (FIG. 5) is structured to receive the at least one line voltage 42 and, for each of the circuit breakers 34 of the number of circuit breaker modules 4,5,6, the at least one load voltage 44. The monitoring module 8 also includes a monitoring circuit 46 (FIGS. 11 and 12) structured to monitor the at least one line voltage 42 and, for each of the circuit breakers 34 of the number of circuit breaker modules 4,5,6, the at least one load voltage 44.

Each of the number of third connectors 16,17,18 (FIG. 4) is structured to output, for each of the circuit breakers 34 of a number of the number of circuit breaker modules 4,5,6, the at least one load voltage 44 from the connector 7 (FIG. 6) of a corresponding one of the number of circuit breaker modules 4,5,6 and the frame connector 14.

Figure 2:
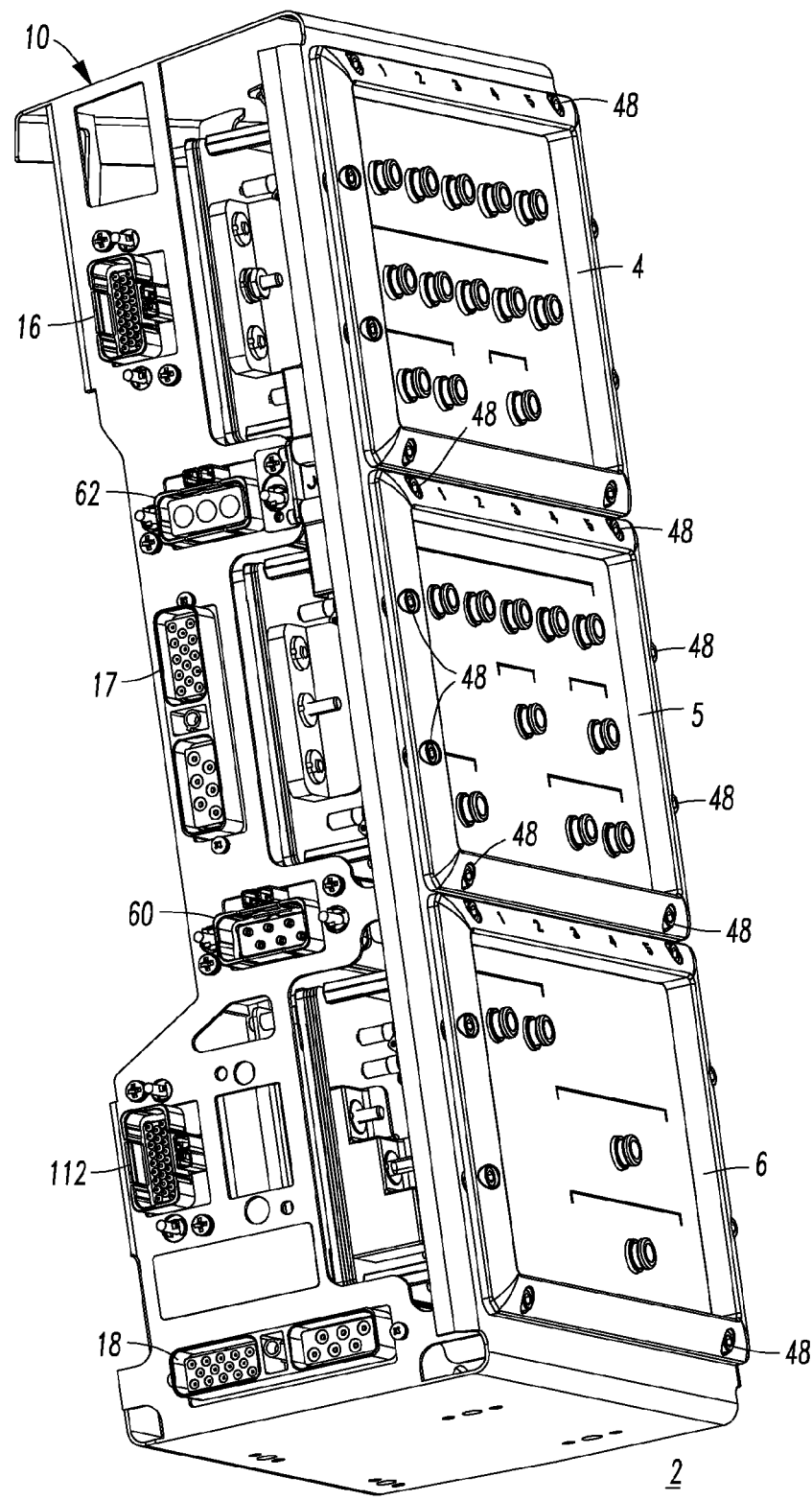
FIGS. 2 and 3 are side vertical elevation views of the circuit breaker panel of FIG. 1, except with three circuit breaker modules installed.
Figure 3:
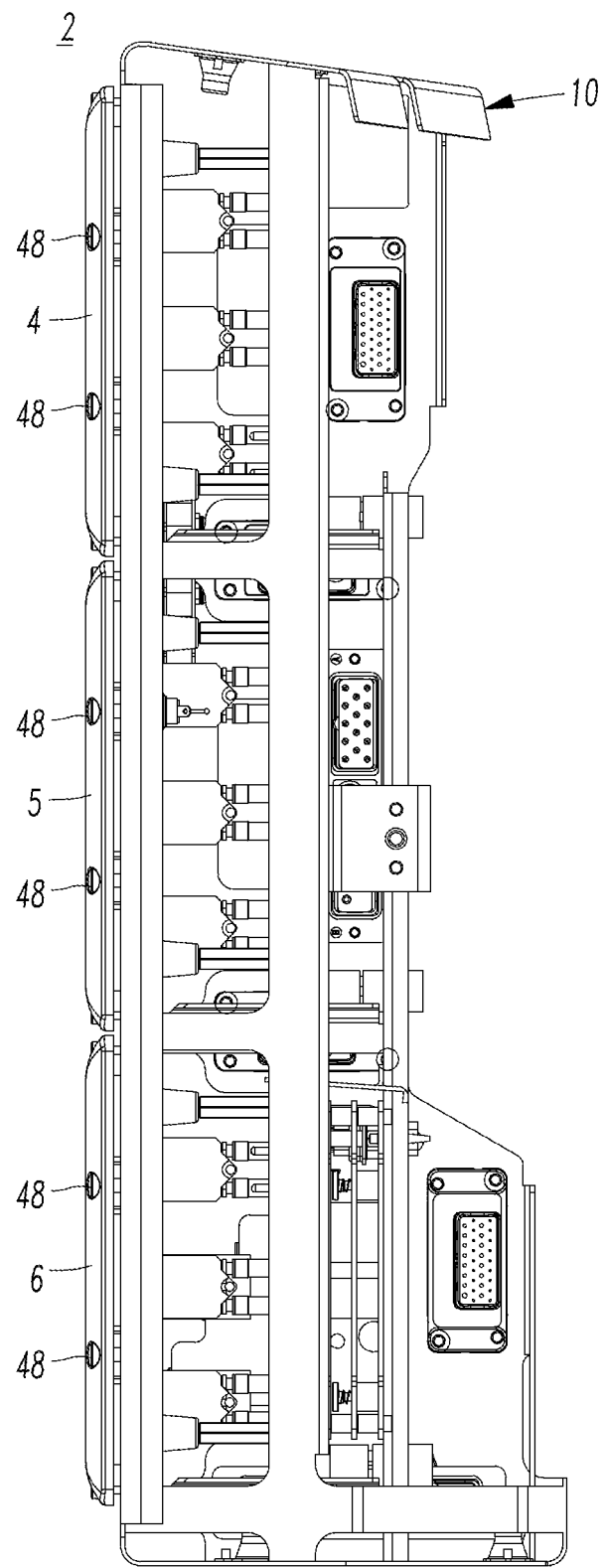

Each of the number of circuit breaker modules 4,5,6 also includes a number of fasteners 48 (FIG. 2). The monitoring module 8 includes a number of fasteners 50 (FIG. 5). The frame 10 includes a number of first apertures 52 (FIG. 4) cooperating with the number of fasteners 50 of the monitoring module 8 to removably fasten the monitoring module 8 to the frame 10. The frame 10 also includes a number of sets 54 of a number of second apertures 56 (FIG. 4), each of the number of sets 54 cooperating with the number of fasteners 48 of a corresponding one of the number of circuit breaker modules 4,5,6 to removably fasten the corresponding one of the number of circuit breaker modules 4,5,6 to the frame 10.

The example number of third connectors 16,17,18 (FIG. 4) can include a number of a first AC load connectors 18 for a plurality of AC loads (not shown), and a number of second DC load connectors 16,17 for a plurality of DC loads (not shown).

Figure 15:
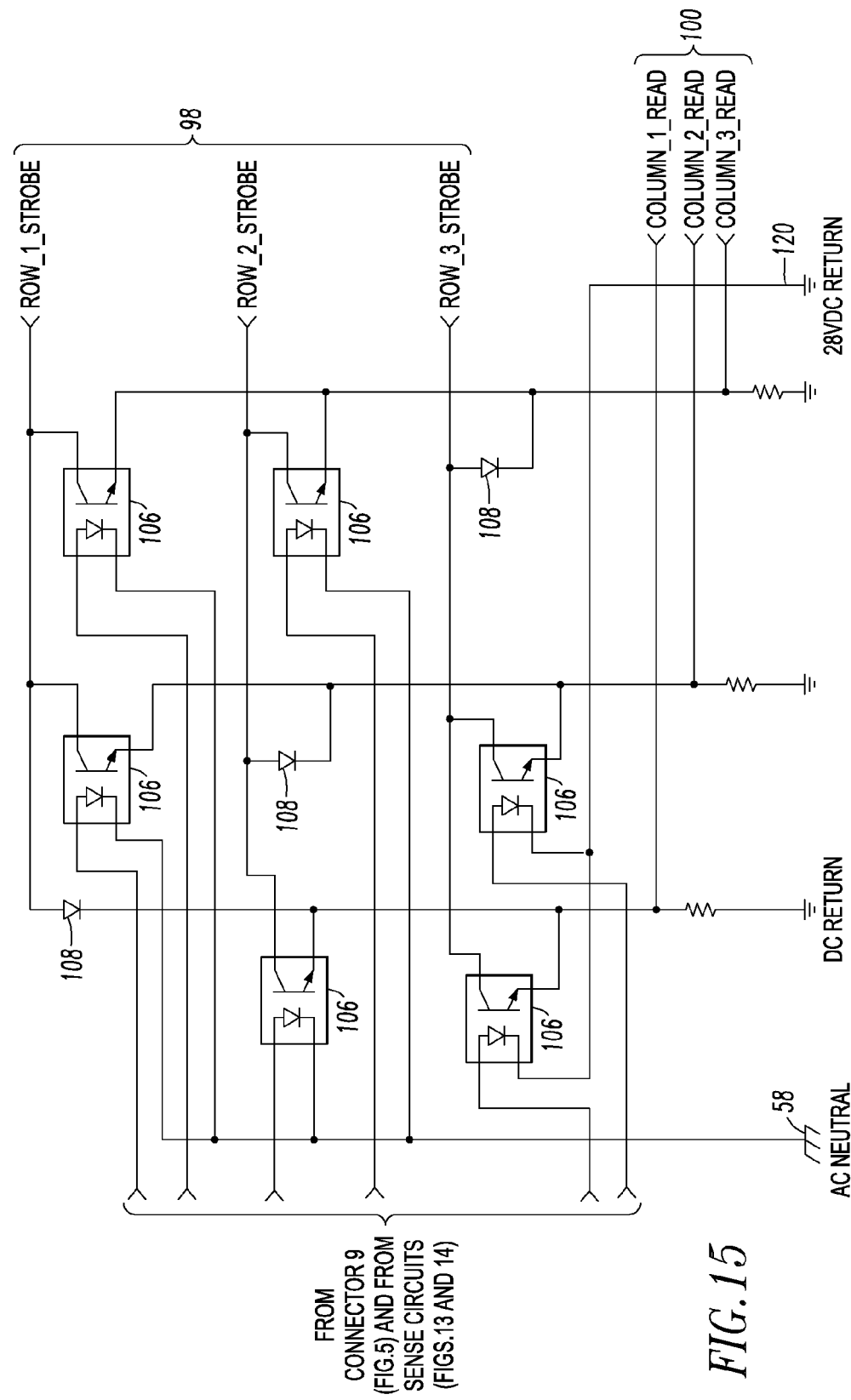
FIG. 15 is a block diagram in schematic form of a portion of the monitoring module of FIG. 5.

The example frame 10 is electrically connected to AC neutral 58 (FIG. 15).

Figure 4:
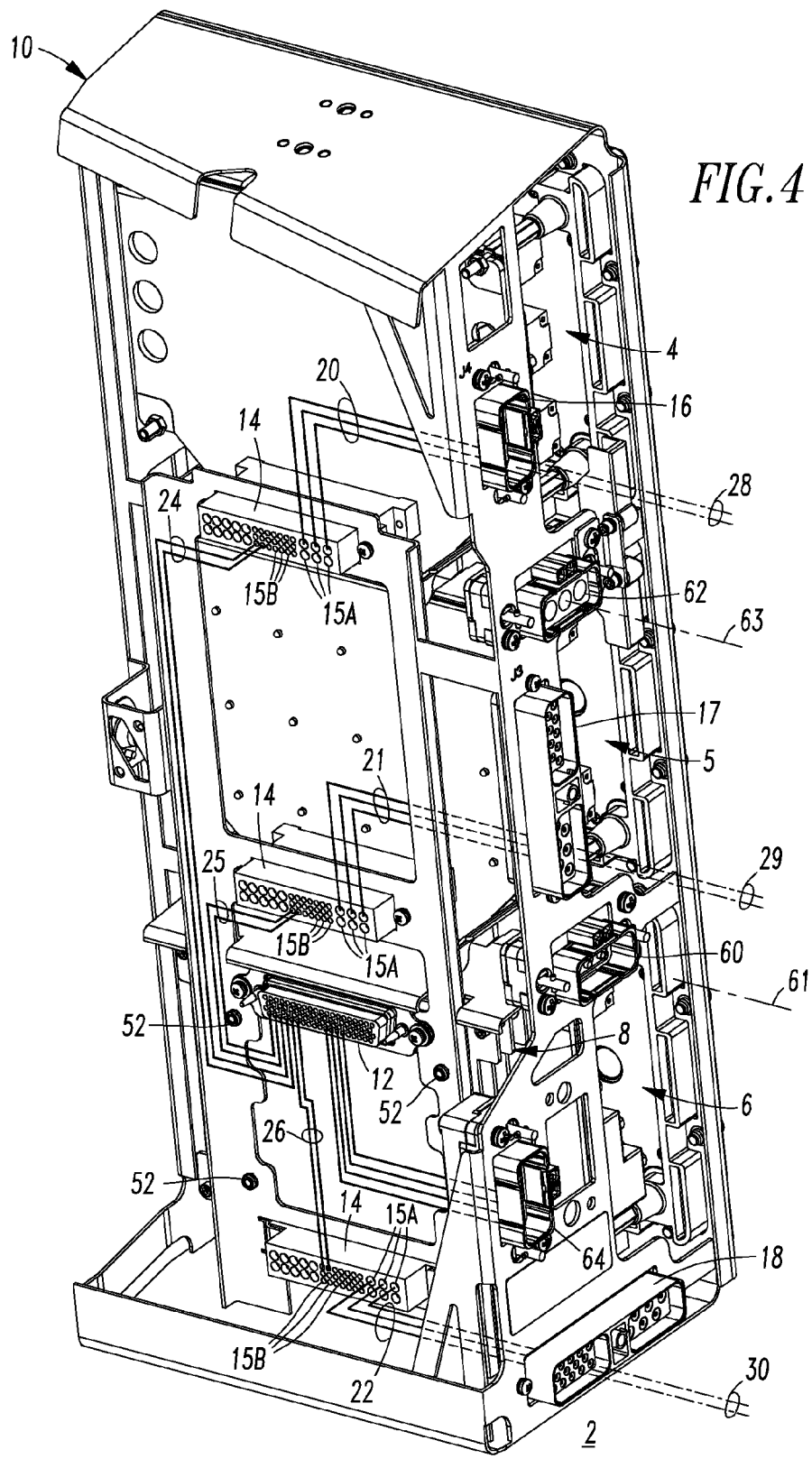
FIG. 4 is a rear isometric view of the circuit breaker panel of FIG. 1.
Figure 5:
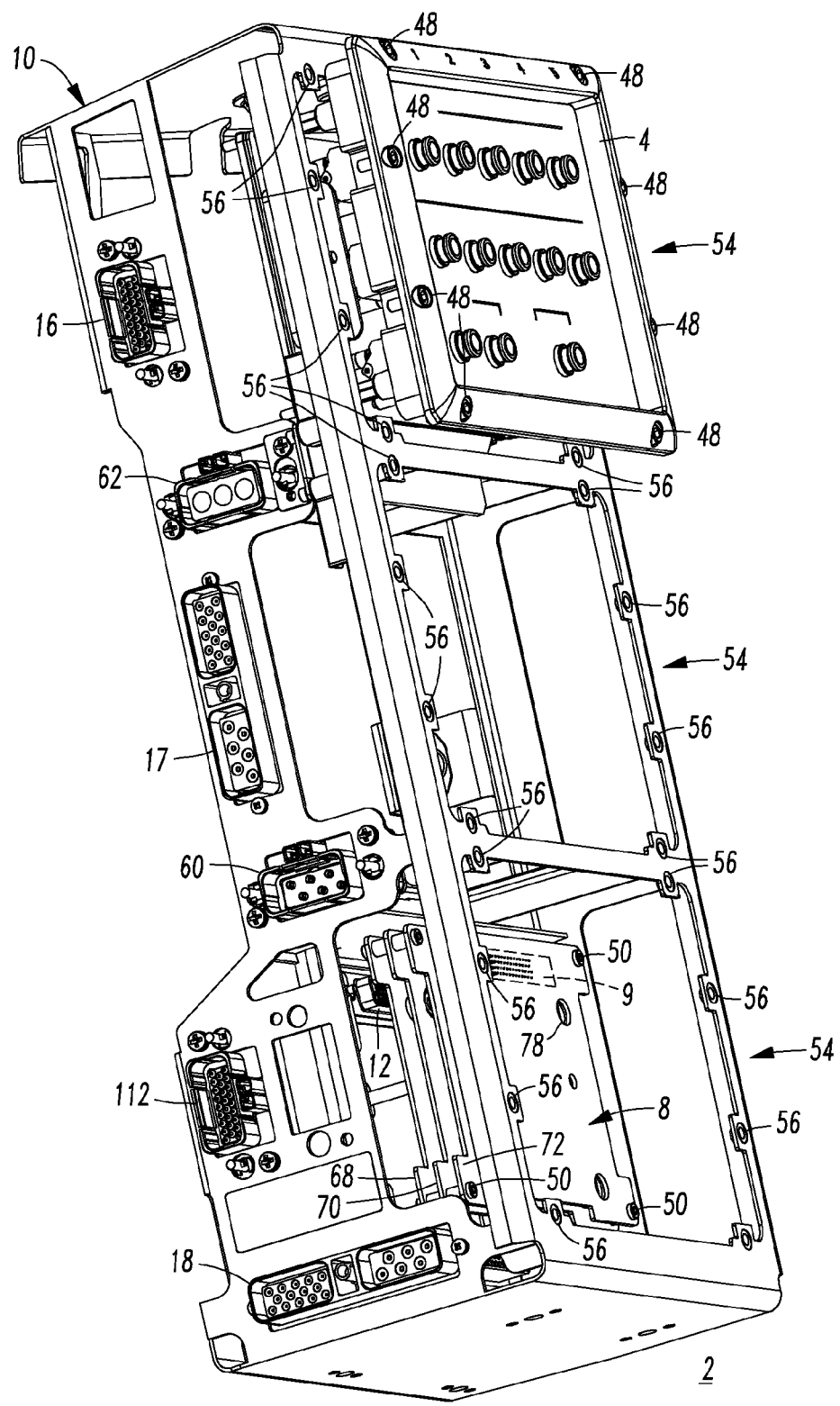
FIG. 5 is a partially exploded isometric view of the circuit breaker panel of FIG. 1, except with another circuit breaker module removed.

Referring to FIG. 4, the circuit breaker panel 2 further includes an AC line connector 60 (e.g., without limitation, receiving #12 AWG conductors 61 from an AC power bus (not shown) and corresponding to the at least one line voltage 42 (FIG. 16)), a DC line connector 62 (e.g., without limitation, receiving #8 AWG conductors 63 from a DC power bus (not shown) and corresponding to the at least one line voltage 42' (FIG. 17)), and a connector 64 for output CAN, communications and lighting to a master system power distribution assembly (MSPDA 65 (FIG. 11)).

Figure 6:
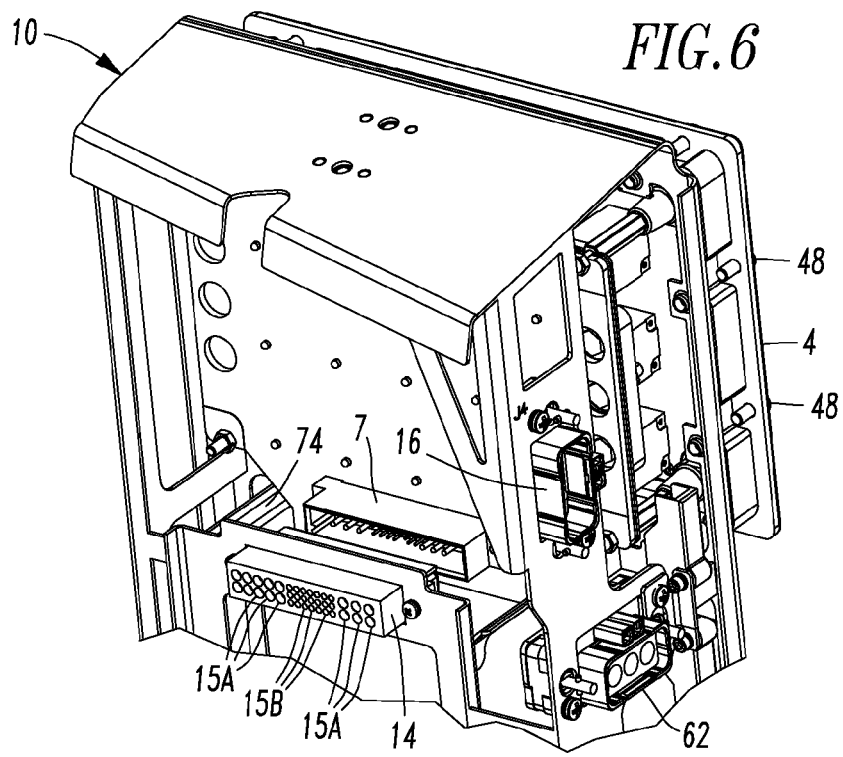
FIGS. 6 and 7 are partially exploded isometric views of portions of the circuit breaker panel of FIG. 1.

Referring to FIGS. 1, 5 and 6, for removal of one of the circuit breaker modules 4,5,6, a number of example fasteners 48 (e.g., without limitation, eight captive screws) are removed to remove each module. The number of fasteners 48 is disengaged from the frame 10 at a corresponding set 54 of the number of apertures 56. The number of connectors 32 of a corresponding one of the circuit breaker modules 4,5,6 includes a line connector 43,43' as shown in respective FIGS. 16 and 17. For removal of the corresponding one of the circuit breaker modules 4,5,6, a number of line conductors 45,45' are also removed from the line connector 43,43'. As shown in FIGS. 16 and 17 with modules 6' and 4", for each module 4,5,6, a number (e.g., without limitation, one #8 AWG wire for DC modules 4,5; three or four #12 AWG wires for AC module 6) of aircraft feeder cables are removed from the corresponding module (e.g., without limitation, using a nut driver (not shown)). Removal of the lower (with respect to FIG. 5) AC module 6 (FIGS. 1 and 2) provides access to the monitoring module 8, such as an example electronics line replaceable module (LRM), which includes a CAN bus PCB 68, a lighting PCB 70 and a monitor matrix PCB 72.

As shown in FIGS. 1 and 6, the frame 10 further includes a pair of guide rails 74 for each of the number of circuit breaker modules 4,5,6, in order to provide positive alignment prior to engaging a corresponding one of the number of second connectors 14, which are coupled to the frame 10. The guide rails 74 provide positive module alignment prior to engaging a rigid load/communication connector 14. The example number of fasteners 48 couple the module 4 to the mounting structure of the frame 10. The load connectors 16,17,18 (FIG. 4) receive the various load conductors 20,21,22 from individual circuit breakers 34 of the corresponding module 4,5,6 to corresponding system loads (not shown). The line connectors 60,62 receive a number of line conductors 61,63 (shown in phantom line drawing in FIG. 4) from a corresponding line (e.g., feeder) bus (not shown). The load/communication connector 14 provides various monitoring connections 24,25,26 (e.g., without limitation, #22 AWG) (e.g., without limitation, at the left and right sides (with respect to FIGS. 4, 6 and 7)) from the circuit breaker module 4 to the monitoring module 8, and various load conductors 20,21,22 (e.g., without limitation, #16 AWG) from individual circuit breakers 34 of the modules 4,5,6 to the load connectors 16,17,18.

Figure 7:
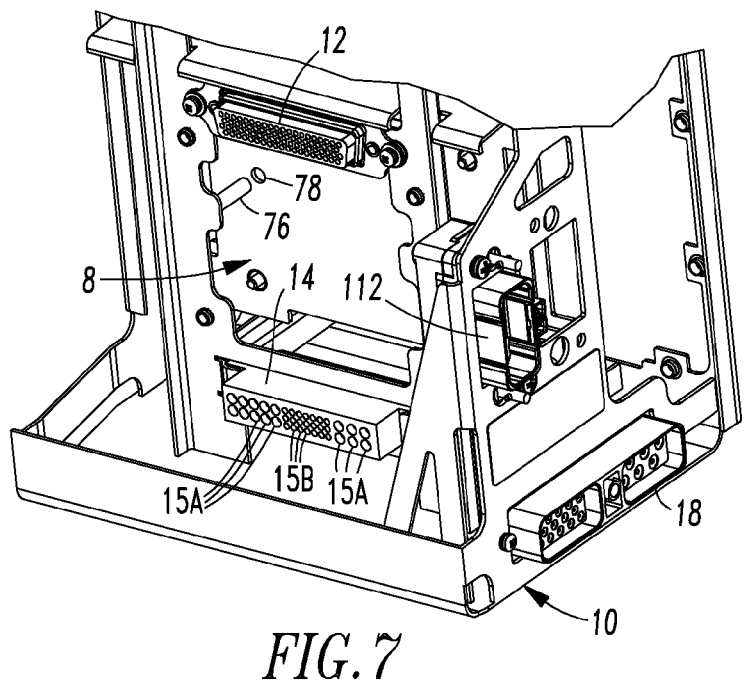

Referring to FIGS. 4, 5 and 7, for removal of the monitoring module 8, a number of example fasteners (e.g., without limitation, four captive screws) 50 are disengaged from the frame 10 at the number of first apertures 52. Proper engagement of the connector 12 and the printed circuit board mating connector 9 is provided by a guide pin 76 that provides a guided blind mate assembly. The monitoring module 8 is located behind (with respect to FIG. 1) the example circuit breaker module 6. For removal of the monitoring module 8, one of the number of circuit breaker modules 4,5,6 is removed from the frame 10 before removal of the monitoring module 8 from the frame 10. In this example, the AC circuit breaker module 6 is removed. The frame 10 further includes a number of guide pins 76 (one guide pin 76 is shown) for the monitoring module 8. The monitoring circuit 46 (FIGS. 11 and 12) of the monitoring module 8 includes a number of printed circuit boards 68,70,72 having an opening 78 therethrough. The opening 78 receives the guide pin 76 in order to provide positive alignment prior to engaging the connector 12 coupled to the frame 10.

FIG. 9 shows the rear of the example circuit breaker module 4' including the connector 7. It will be appreciated that various feeders (not shown), such as, for example and without limitation, a number of three-terminal terminal blocks (for a number of AC feeders) (FIG. 16) and a number of one-terminal terminal blocks (for a number of DC feeders) (FIG. 17), can accept a number of power inputs (e.g., without limitation, a number of AC lines; a number of DC lines) from a number of feeders (not shown). The example connector 7 provides outputs (e.g., without limitation, for a number of single-phase AC loads; a number of DC loads) to a number of loads (not shown). The circuit structure 40 of FIG. 10 includes an electrical bus structure 41 (e.g., as shown in FIG. 17), a current limiter 80 or 82 (FIGS. 13 and 14) for each of the circuit breakers 34 of a corresponding one of the number of circuit breaker modules 4,5,6, and a plurality of sets of terminals 84, each of the sets 84 receiving the at least one line terminal 36 and the at least one load terminal 38 of a corresponding one of the circuit breakers 34 as shown in FIG. 17. The number of connectors 32 of each of the number of circuit breaker modules 4,5,6 includes a load connector 7 directly outputting the at least one load voltage 44 and indirectly outputting the at least one load voltage 44 through the current limiter 80 or 82 of a corresponding one of the circuit breakers 34 of a corresponding one of the number of circuit breaker modules 4,5,6.

A number of line connectors 43 (FIG. 16) receives the at least one line voltage 42. The electrical bus structure 41 (FIG. 17) includes a plurality of first layers 86 (FIG. 10) that form a conductive power bus and a second layer 88 (FIG. 13) including the current limiters 80 or 82 (e.g., of a circuit breaker sensing circuit including diodes 90 and resistors 92 of FIGS. 13 and 14) for each of the circuit breakers 34 of a corresponding one of the number of circuit breaker modules 4,5,6. For example, the electrical bus structure 41 can include a plurality of layers 86 that form a conductive power bus. For example, three different layers 86 can be employed for a three-phase AC application.

The example electrical bus structure 41 can employ, for example and without limitation, a relatively thin laser cut or stamped copper bussing (partially shown in FIG. 17) (e.g., without limitation, 0.015 in. thickness for 75 A continuous current) for the layers 86. The example copper bussing can be sandwiched between layers (not shown) of thermally conductive thermoplastic (e.g., without limitation, thermally conductive LCP thermoplastic), which prevents localized heating (or hot spots). The example copper layers 86 and thermoplastic layers (not shown) can be bonded together with a structural tape (not shown), such as for example and without limitation, stamped 0.020 in. thickness 3M™ VHB™ Tape marketed by 3M of St. Paul, Minn. The example structural tape: (1) transfers to epoxy upon being heated and is cross-linked, in order that re-heating has no effect; (2) provides a seal around the internal copper bussing, thereby creating a suitable dielectric/moisture barrier; and (3) bonds the copper and thermoplastic layers together (e.g., bonds one of the copper layers to a corresponding one of the two layers of the thermally conductive thermoplastic).

For example, one of the layers 86 of the electrical bus structure 41 can be made from FR4 or another common circuit board material.

Figure 11:
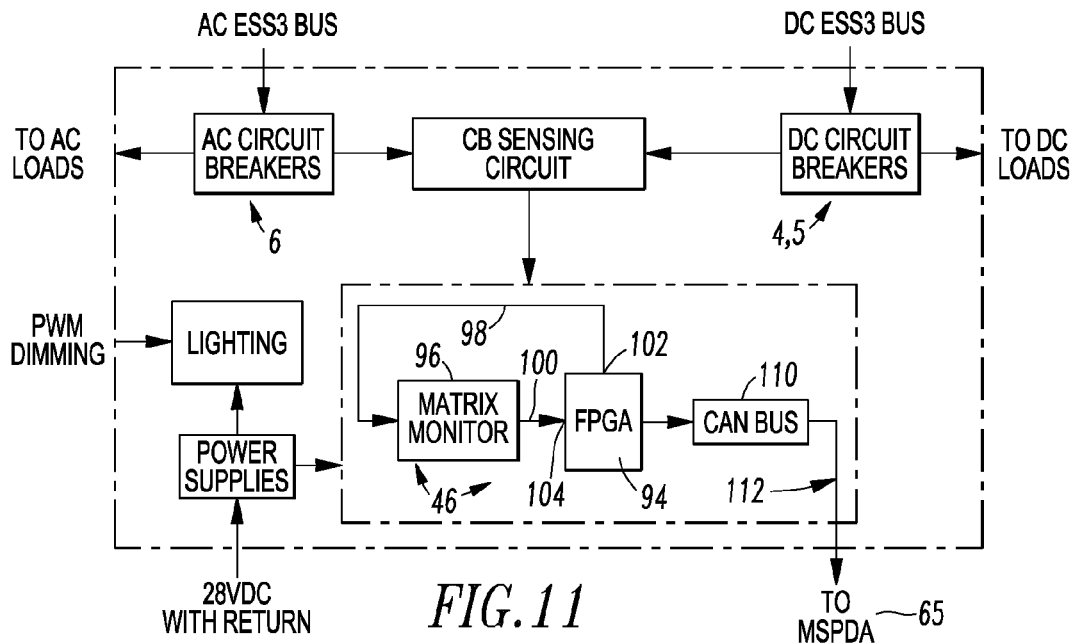
FIG. 11 is a top level functional block diagram of the circuit breaker panel of FIG. 1.

FIG. 11 shows that the example monitoring circuit 46 includes a processor 94 and a matrix circuit 96 having a plurality of rows 98, a plurality of columns 100, a row strobe circuit 102, a column sensing circuit 104, and, for each combination of one of the rows 98 and one of the columns 100, one of an isolator 106 (e.g., without limitation, an optocoupler) and a diode 108 as shown in FIG. 15. The isolator 106 is structured to receive and electrically isolate one of the at least one line voltage 42,42' and the at least one load voltage 44,44' from the monitoring circuit 46.

The monitoring module 8 further includes a reporting circuit 110 reporting external to the circuit breaker panel 2, for each of the circuit breakers 34 of the number of circuit breaker modules 4,5,6, status corresponding to the at least one line voltage 42,42' and the at least one load voltage 44,44'. The example diodes 108 are electrically connected between one of the rows 98 and one of the columns 100 and are structured to cooperate with the processor 94 and the matrix circuit 96 to provide a corresponding test function of the one of the rows 98 and the one of the columns 100.

The example matrix circuit 96 can be structured, for example, such that the plurality of rows 98 is nine rows, and the plurality of columns 100 is five columns, in order that the matrix circuit 96 is structured to monitor up to 45 of: (a) the at least one load voltage 44,44' (b) the diode 108 for each combination of one of the rows 98 and one of the columns 100, and (c) the at least one line voltage 42,42'.

Figure 12:
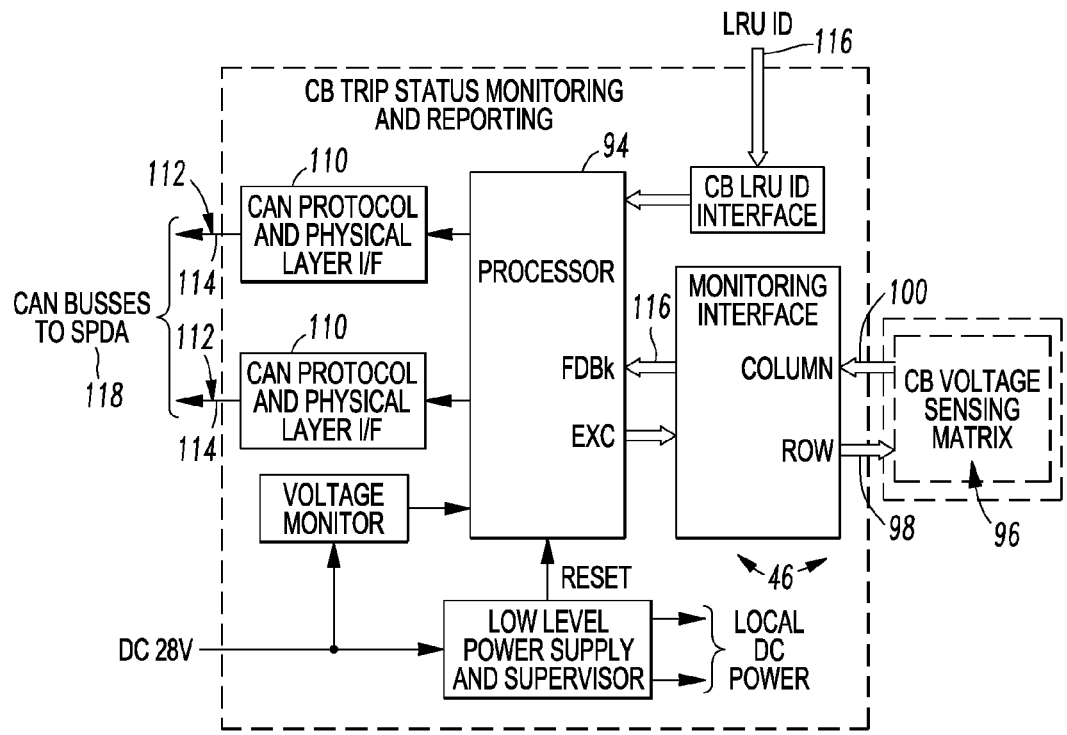
FIG. 12 is a functional block diagram of the monitor matrix printed circuit board of FIG. 5.

Referring to FIGS. 11 and 12, the monitoring module 8 further includes an external communications bus 112 for communicating a plurality of status signals 114 as a function of a plurality of voltage signals 116 of the plurality of second conductors 24,25,26. The status signals 114 include, for each of the circuit breakers 34, an indication that a corresponding one of the second conductors 24,25,26 is energized, which corresponds to a corresponding one of the circuit breakers 34 being closed, and an indication that another corresponding one of the second conductors 24,25,26 is energized, which corresponds to a corresponding feeder (not shown) being energized.

For purposes of identifying the corresponding circuit breaker 34, the processor 94 inputs a LRU ("line replaceable unit") ID 116 (e.g., corresponding to the left side or the right side of an aircraft cockpit). The reporting circuits 110 output to a SPDA ("secondary power distribution assembly") 118.

Figure 13:
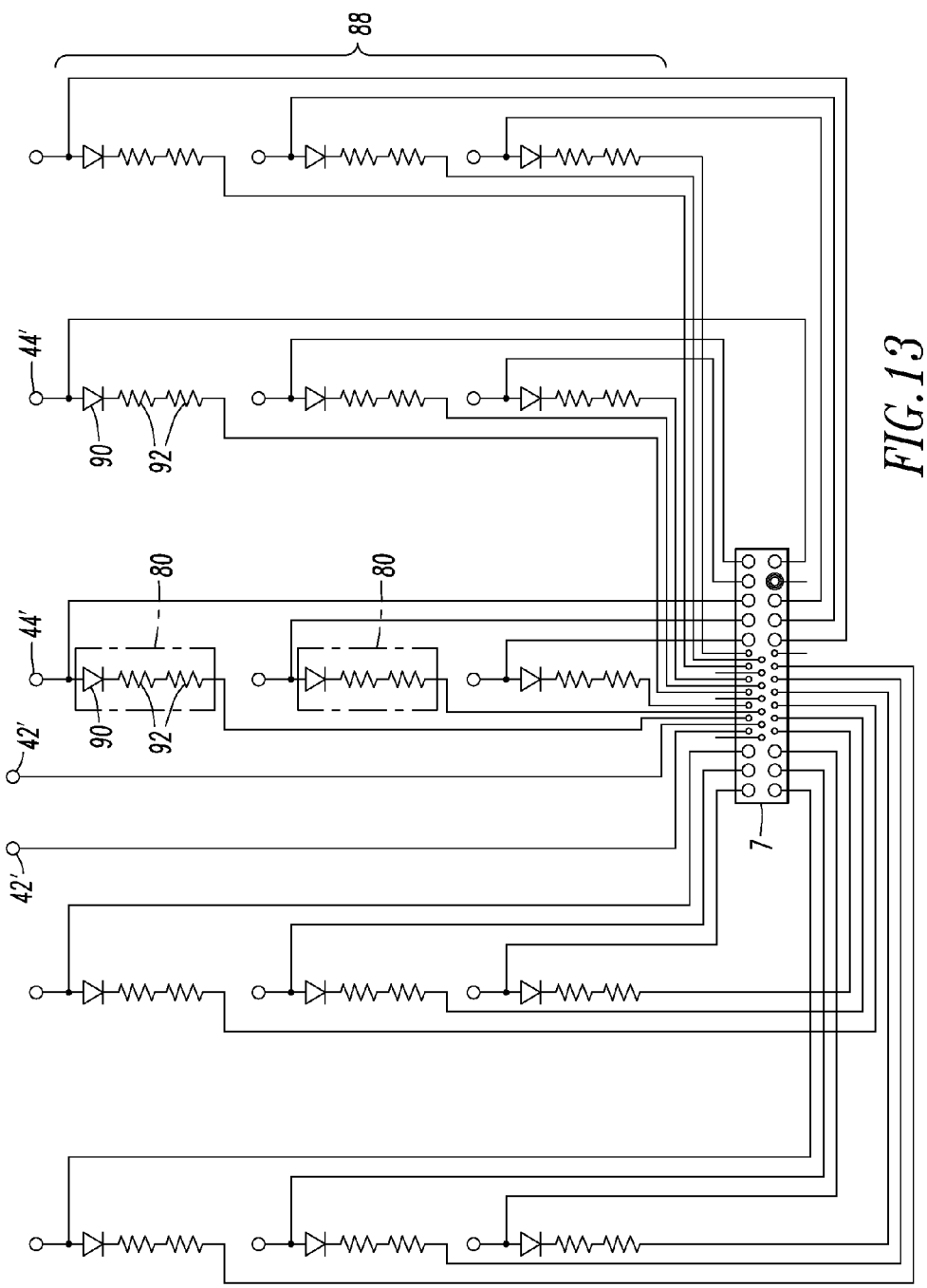
FIG. 13 is a block diagram in schematic form of a portion of the DC circuit breaker panel module of FIG. 1.
Figure 14:
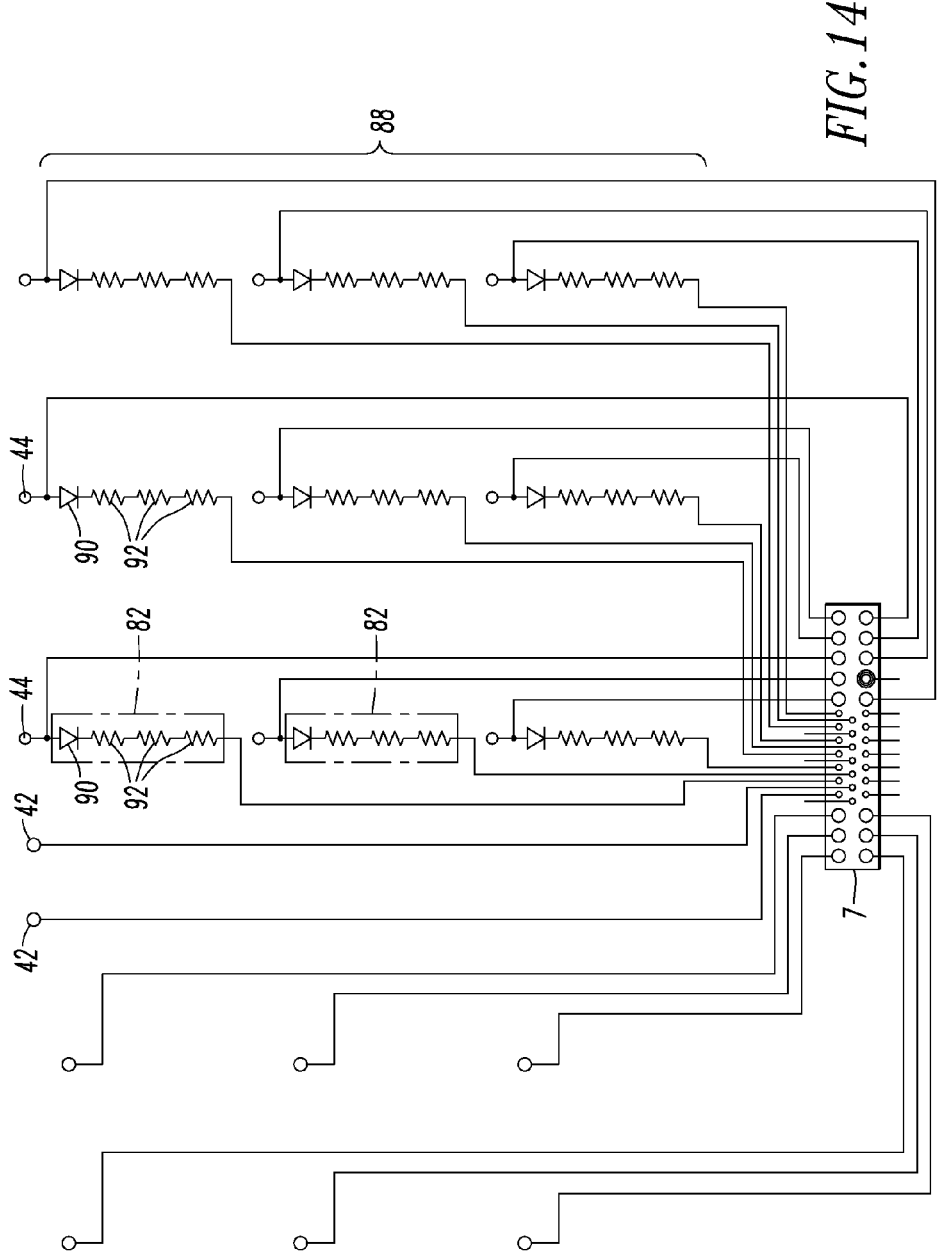
FIG. 14 is a block diagram in schematic form of a portion of the AC circuit breaker panel module of FIG. 1.

FIGS. 13 and 14 show examples of the current limiters 80,82 for the DC and AC modules 4,6.

The circuit shown in FIG. 15 is a portion of the complete matrix circuit 96 including three example columns 100 and three example rows 98. An optocoupler 106 or a diode 108 is used for each row/column combination. Each of the optocouplers 106 is for a corresponding circuit breaker 34 and provides galvanic isolation of the digital circuits from the corresponding power circuit. Each of the diodes 108 (e.g., row #1 to column #1; row #2 to column #2, etc.) provides a corresponding row and column test function. An AC neutral connection 58 (to the frame 10) is employed and is isolated from the 28 VDC return 120. The example matrix circuit 96 can sense 45 circuit breakers, diagnostic diodes 108 and line voltages 42,42'.

FIGS. 16 and 17 show the line connectors 43,43' for an AC module 6' and a DC module 4'', respectively. Adding an AC feeder (not shown) or a DC feeder (not shown) for a corresponding AC module 6 or DC module 4,5 is readily achieved. The module connector pin quantity and size selection supports a provisional secondary power buss. Similar to the connector 14, the outside pins of the connectors 7 are for various AC and DC loads (not shown). Such a provisional buss permits easy addition of circuit breakers 34 or modifications to existing circuit breakers 34 by swapping a circuit breaker module 4,5,6, modifying a table (not shown) in memory (not shown) of the processor 94, and adding a corresponding load conductor 20,21,22 (FIG. 4) and a corresponding status monitoring conductor 24,25,26 (FIG. 4).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit breaker panel comprising:
   a number of circuit breaker modules, each of said number of circuit breaker modules comprising a number of connectors, a plurality of circuit breakers each including at least one line terminal and at least one load terminal, and a circuit structure supporting said circuit breakers and electrically interconnecting the at least one line terminal and the at least one load terminal of each of said circuit breakers with said number of connectors, said at least one line terminal being structured to receive at least one line voltage, said at least one load terminal being structured to output at least one load voltage;
   a monitoring module comprising a connector structured to receive the at least one line voltage and, for each of said circuit breakers of said number of circuit breaker modules, the at least one load voltage, and a monitoring circuit structured to monitor the at least one line voltage and, for each of said circuit breakers of said number of circuit breaker modules, the at least one load voltage;
   a frame comprising:
      a first connector coupled to said frame and structured to removably electrically and mechanically engage the connector of said monitoring module,
      a number of second connectors coupled to said frame, each of said number of second connectors being structured to removably electrically and mechanically engage the connector of a corresponding one of said number of circuit breaker modules, and
      a number of third connectors coupled to said frame, each of said number of third connectors being structured to output, for each of said circuit breakers of a number of said number of circuit breaker modules, the at least one load voltage from the connector of a corresponding one of said number of circuit breaker modules;
   a plurality of first conductors, each of said plurality of first conductors being electrically connected between one of the number of third connectors and one of the number of second connectors corresponding to the connector of one of said number of circuit breaker modules;
   a plurality of second conductors, each of said plurality of second conductors being electrically connected between the first connector and one of the number of second connectors corresponding to the connector of one of said number of circuit breaker modules,
   wherein each of said number of third connectors is further structured to receive a plurality of third conductors, each of said plurality of third conductors being structured to be electrically connected to a corresponding load, and
   whereby any of said monitoring module and said number of circuit breaker modules can be installed into or removed from said frame without change to any of said plurality of first conductors, said plurality of second conductors and said plurality of third conductors.

2. The circuit breaker panel of claim 1 wherein the circuit structure comprises an electrical bus structure, a current limiter for each of the circuit breakers of a corresponding one of said number of circuit breaker modules, and a plurality of sets of terminals, each of said sets receiving the at least one line terminal and the at least one load terminal of a corresponding one of said circuit breakers; and wherein the number of connectors of each of said number of circuit breaker modules include a load connector directly outputting the at least one load voltage and indirectly outputting the at least one load voltage through the current limiter of a corresponding one of the circuit breakers of a corresponding one of said number of circuit breaker modules, and a number of line connectors receiving the at least one line voltage.

3. The circuit breaker panel of claim 2 wherein the electrical bus structure comprises a plurality of first layers that form a conductive power bus and a second layer including the current limiter for each of the circuit breakers of a corresponding one of said number of circuit breaker modules.

4. The circuit breaker panel of claim 1 wherein the number of third connectors are a first AC load connector for a plurality of AC loads and a second DC load connector for a plurality of DC loads.

5. The circuit breaker panel of claim 1 wherein each of said number of circuit breaker modules further comprises a number of line connectors receiving the at least one line voltage.

6. The circuit breaker panel of claim 5 wherein the number of line connectors is a plurality of AC line connectors receiving a plurality of AC line voltages.

7. The circuit breaker panel of claim 5 wherein the number of line connectors is a DC line connector receiving a DC line voltage.

8. The circuit breaker panel of claim 1 wherein each of the number of second connectors includes a first plurality of conductor members for a plurality of the plurality of first conductors, each of said plurality of the plurality of first conductors being electrically connected between one of the number of third connectors and one of the first plurality of conductor members, and each of the number of second connectors further includes a second plurality of conductor members for a plurality of the plurality of second conductors, each of said plurality of the plurality of second conductors being electrically connected between the first connector and one of the second plurality of conductor members.

9. The circuit breaker panel of claim 1 wherein said monitoring module further comprises an external communications bus for communicating a plurality of status signals as a function of a plurality of voltage signals of said plurality of second conductors.

10. The circuit breaker panel of claim 9 wherein the status signals include, for each of said circuit breakers, an indication that a corresponding one of the second conductors is energized, which corresponds to a corresponding one of said circuit breakers being closed, and an indication that another corresponding one of the second conductors is energized, which corresponds to a corresponding feeder being energized.

11. The circuit breaker panel of claim 1 wherein said frame is electrically connected to AC neutral.

12. The circuit breaker panel of claim 1 wherein said monitoring module is located behind one of said number of circuit breaker modules; and wherein, for removal of said monitoring module, said one of said number of circuit breaker modules is removed from said frame before removal of said monitoring module from said frame.

13. The circuit breaker panel of claim 12 wherein said one of said number of circuit breaker modules is an AC circuit breaker module.

14. The circuit breaker panel of claim 1 wherein said frame further comprises a pair of guide rails for each of said number of circuit breaker modules, in order to provide positive alignment prior to engaging a corresponding one of said number of second connectors coupled to said frame.

15. The circuit breaker panel of claim 1 wherein said frame further comprises a guide pin for said monitoring module; and wherein the monitoring circuit of said monitoring module comprises a number of printed circuit boards having an opening therethrough, said opening receiving the guide pin in order to provide positive alignment prior to engaging the first connector coupled to said frame.

16. The circuit breaker panel of claim 1 wherein the monitoring circuit comprises a processor and a matrix circuit comprising a plurality of rows, a plurality of columns, a row strobe circuit, a column sensing circuit, and, for each combination of one of the rows and one of the columns, one of an isolator and a diode; and wherein the isolator is structured to receive and electrically isolate one of said at least one line voltage and the at least one load voltage from the monitoring circuit.

17. The circuit breaker panel of claim 16 wherein said isolator is an optocoupler.

18. The circuit breaker panel of claim 16 wherein said monitoring module further comprises a reporting circuit reporting external to said circuit breaker panel, for each of said circuit breakers of said number of circuit breaker modules, status corresponding to the at least one line voltage and the at least one load voltage.

19. The circuit breaker panel of claim 16 wherein the diode is electrically connected between one of the rows and one of the columns and is structured to cooperate with the processor and the matrix circuit to provide a corresponding test function of said one of the rows and said one of the columns.

20. The circuit breaker panel of claim 19 wherein the plurality of rows is nine rows; wherein the plurality of columns is five columns; and wherein said matrix circuit is structured to monitor up to 45 of: (a) said at least one load voltage, (b) the diode for each combination of one of the rows and one of the columns, and (c) said at least one line voltage.

21. A circuit breaker panel comprising:
    a number of circuit breaker modules, each of said number of circuit breaker modules comprising a number of fasteners, a number of connectors, a plurality of circuit breakers each including at least one line terminal and at least one load terminal, and a circuit structure supporting said circuit breakers and electrically interconnecting the at least one line terminal and the at least one load terminal of each of said circuit breakers with said number of connectors, said at least one line terminal being structured to receive at least one line voltage, said at least one load terminal being structured to output at least one load voltage;
    a monitoring module comprising a number of fasteners, a connector structured to receive the at least one line voltage and, for each of said circuit breakers of said number of circuit breaker modules, the at least one load voltage, and a monitoring circuit structured to monitor the at least one line voltage and, for each of said circuit breakers of said number of circuit breaker modules, the at least one load voltage;
    a frame comprising:
        a number of first apertures cooperating with the number of fasteners of said monitoring module to removably fasten said monitoring module to said frame,
        a number of sets of a number of second apertures, each of said number of sets cooperating with the number of fasteners of a corresponding one of said number of circuit breaker modules to removably fasten the corresponding one of said number of circuit breaker modules to said frame,
        a first connector coupled to said frame and structured to removably electrically and mechanically engage the connector of said monitoring module,
        a number of second connectors coupled to said frame, each of said number of second connectors being structured to removably electrically and mechanically engage the connector of a corresponding one of said number of circuit breaker modules, and
        a number of third connectors coupled to said frame, each of said number of third connectors being structured to output, for each of said circuit breakers of a number of said number of circuit breaker modules, the at least one load voltage from the connector of a corresponding one of said number of circuit breaker modules;
    a plurality of first conductors, each of said plurality of first conductors being electrically connected between one of the number of third connectors and one of the number of second connectors corresponding to the connector of one of said number of circuit breaker modules;
    a plurality of second conductors, each of said plurality of second conductors being electrically connected between the first connector and one of the number of second connectors corresponding to the connector of one of said number of circuit breaker modules, wherein each of said number of third connectors is further structured to receive a plurality of third conductors, each of said plurality of third conductors being structured to be electrically connected to a corresponding load, and whereby any of said monitoring module and said number of circuit breaker modules can be installed into or removed from said frame without change to any of said plurality of first conductors, said plurality of second conductors and said plurality of third conductors.

22. The circuit breaker panel of claim 21 wherein, for removal of one of said circuit breaker modules, the number of fasteners of said one of said circuit breaker modules is disengaged from said frame at a corresponding one of the sets of the number of second apertures; wherein said number of connectors of said one of said circuit breaker modules includes a line connector; and wherein, for removal of said one of said circuit breaker modules, a number of line conductors are also removed from the line connector.

23. The circuit breaker panel of claim 21 wherein, for removal of said monitoring module from said frame, the number of fasteners of said monitoring module is disengaged from said frame at the number of first apertures.

* * * * *